US012737947B2

(12) United States Patent
Tenenbaum et al.

(10) Patent No.: US 12,737,947 B2
(45) Date of Patent: Sep. 15, 2026

(54) GENERATING AN IMAGE WITH HEAD POSE OR FACIAL REGION IMPROVEMENTS

(71) Applicant: Google LLC, Mountain View, CA (US)

(72) Inventors: Jay Tenenbaum, Mountain View, CA (US); Assaf Zomet, Mountain View, CA (US); Barel Levy, Mountain View, CA (US); Yaron Brodsky, Mountain View, CA (US); Shiran Zada, Mountain View, CA (US); Yael Pritch Knaan, Mountain View, CA (US); Ariel Ephrat, Mountain View, CA (US); Inbar Mosseri, Mountain View, CA (US); Avram Golbert, Mountain View, CA (US)

(73) Assignee: Google LLC, Mountain View, CA (US)

( * ) Notice: Subject to any disclaimer, the term of this patent is extended or adjusted under 35 U.S.C. 154(b) by 50 days.

(21) Appl. No.: 18/906,015

(22) Filed: Oct. 3, 2024

(65) Prior Publication Data

US 2025/0111570 A1 Apr. 3, 2025

Related U.S. Application Data

(60) Provisional application No. 63/542,283, filed on Oct. 3, 2023.

(51) Int. Cl.
*G06T 11/60* (2026.01)
*G06T 5/77* (2024.01)
(Continued)

(52) U.S. Cl.
CPC ................ *G06T 11/60* (2013.01); *G06T 5/77* (2024.01); *G06F 3/0484* (2013.01); *G06T 7/30* (2017.01); *G06T 15/205* (2013.01)

(58) Field of Classification Search
None
See application file for complete search history.

(56) References Cited

U.S. PATENT DOCUMENTS

2002/0082082 A1* 6/2002 Stamper .................. A63F 13/63 463/32
2014/0369627 A1 12/2014 Huang et al.
(Continued)

FOREIGN PATENT DOCUMENTS

CN 113255551 A * 8/2021 ............. G06N 3/045
JP 2006-330800 12/2006
(Continued)

OTHER PUBLICATIONS

Machine translation of CN 113255551A (Year: 2021).*
(Continued)

*Primary Examiner* — Tapas Mazumder
(74) *Attorney, Agent, or Firm* — IP Spring

(57) ABSTRACT

A media application receives a set of images that include a source image and a target image, the source image and the target image including at least a subject. The media application determines whether to use one or more editors selected from a group of a head editor, a face editor, or combinations thereof. Responsive to determining to use the head editor, the media application generates a compositive image by replacing at least a portion of head pixels associated with a target head of the subject in the target image with head pixels from a source head of the subject in the source image and replacing neck pixels associated with a target neck and shoulder pixels associated with target shoulders that include an area between the target head and a target torso with an interpolated region that is generated from an interpolation of the source image and the target image.

20 Claims, 13 Drawing Sheets

(51) Int. Cl.

| | |
|---|---|
| *G06F 3/0484* | (2022.01) |
| *G06T 7/30* | (2017.01) |
| *G06T 15/20* | (2011.01) |

(56) References Cited

U.S. PATENT DOCUMENTS

| | | | | |
|---|---|---|---|---|
| 2021/0073961 | A1 | 3/2021 | Safdarnejad et al. | |
| 2024/0303830 | A1* | 9/2024 | Chae | G10L 21/10 |

FOREIGN PATENT DOCUMENTS

| | | |
|---|---|---|
| JP | 2008-198062 | 8/2008 |
| JP | 2010-239440 | 10/2010 |
| JP | 2014-123261 | 7/2014 |
| JP | 2014-225870 | 12/2014 |

OTHER PUBLICATIONS

JPO, First Office Action (with English translation) for Japanese Patent Application No. 2025-519836, Dec. 9, 2025, 6 pages.

Shah, et al., "All smiles: automatic photo enhancement by facial expression analysis", Proceedings of the 9th European conference on visual media production, 2012, pp. 1-10.

Agarwala et al., "Interactive Digital Photomontage", ACM Transactions on Graphics (Proceedings of SIGGRAPH 2004), 2004, 3 pages.

EPO, International Search Report for International Patent Application No. PCT/US2024/049845, Jan. 29, 2025, 3 pages.

EPO, Written Opinion for International Patent Application No. PCT/US2024/049845, Jan. 29, 2025, 6 pages.

Hao, et al., "FaR-GAN for One-Shot Face Reenactment", https://arxiv.org/pdf/2005.06402, 2020, 10 pages.

Nirkin, et al., "FSGANv2: Improved Subject Agnostic Face Swapping and Reenactment", IEEE Transactions on Pattern Analysis and Machine Intelligence, vol. 45, No. 1, arXiv preprint arXiv:2202.12972, Jan. 2023, pp. 560-575.

MOIP, Office Action (with English translation) for Korean Patent Application No. 10-2025-7010962, Jul. 9, 2026, 16 pages.

* cited by examiner

500

600

650

700

750

800

850

900

1000

GENERATING AN IMAGE WITH HEAD POSE OR FACIAL REGION IMPROVEMENTS

CROSS-REFERENCE TO RELATED APPLICATIONS

This application is a non-provisional application that claims priority under 35 U.S.C. § 119(e) to U.S. Provisional Patent Application No. 63/542,283, titled "Generating a Group Photo with Head Pose and Facial Recognition Improvements," filed on Oct. 3, 2023, the contents of which are hereby incorporated by reference herein in its entirety.

BACKGROUND

A group photo is a popular way to memorialize an event. Obtaining an image of a group of people where the people are all smiling and looking towards the camera is difficult because the more people in an image, the greater the likelihood that at least one of the people's faces is not their best representation. For example, one person may have their mouth open, another person may have their eyes closed, another person may not be looking at the camera, etc. Also, a person may have their head tilted in a way that is different from others in the picture, at an angle to the camera, or is otherwise in a pose that does not make for a high-quality photo.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A computer-implemented method includes receiving a set of images that include a source image and a target image, the source image and the target image including at least a subject. The method further includes determining, based on the set of images, whether to use one or more editors selected from a group of a head editor, a face editor, or combinations thereof. The method further includes responsive to determining to use the head editor, generating a composite image by replacing at least a portion of head pixels associated with a target head of the subject in the target image with head pixels from a source head of the subject in the source image and replacing neck pixels associated with a target neck and shoulder pixels associated with target shoulders that include an area between the target head and a target torso with an interpolated region that is generated from an interpolation of the source image and the target image.

In some embodiments, the method further includes responsive to determining to use the face editor, adjusting at least a portion of target facial features in the target image based on face pixels from source facial features in the source image. In some embodiments, adjusting at least a portion of target facial features in the target image based on face pixels from the source facial features in the source image includes extracting the target head in an initial pose and the source head, aligning the target head to a canonical pose, encoding the aligned target head as a target vector and the source head as a source vector in latent space, copying one or more components from the source vector to the target vector, rendering a modified target vector that includes the one or more components from the encoded source head, realigning a rendered target head to the initial pose, and blending the realigned target head with the source image.

In some embodiments, determining to use the face editor is based on an angular difference between a first angle of the target head and a second angle of the source head. In some embodiments, wherein determining to use the head editor is based on a bounding box that surrounds the target head or a target face and a distance between the bounding box and bounding boxes associated with one or more other subjects in the target image. In some embodiments, generating the composite image further includes responsive to identifying remaining target pixels in the target image that are associated with the target head and not the source head, inpainting the remaining target pixels. In some embodiments, the method further includes determining an occlusion of the target head or the occlusion of the source head based on determining a difference in color histograms of the target image and the source image, where determining to use the head editor is based on the occlusion of the target head or occlusion of the source head.

In some embodiments, the method further includes before determining, based on the set of images, whether to use the one or more editors, the method further includes capturing, with a camera, the set of images; providing a user interface to a user that includes the target image and an option to select the source head from a set of source images, the set of source images including the source image; and receiving, from the user, a selection of the source image. In some embodiments, the at least one subject in the source image is a human or an animal.

A system comprises one or more processors and one or more computer-readable media, having instructions stored thereon that, when executed by the one or more processors, cause the one or more processors to perform operations. The operations include receiving a set of images that include a source image and a target image, the source image and the target image including at least a subject; determining, based on the set of images, whether to use one or more editors selected from a group of a head editor, a face editor, or combinations thereof; and responsive to determining to use the head editor, generating a composite image by replacing at least a portion of head pixels associated with a target head of the subject in the target image with head pixels from a source head of the subject in the source image and replacing neck pixels associated with a target neck and shoulder pixels associated with target shoulders that include an area between the target head and a target torso with an interpolated region that is generated from an interpolation of the source image and the target image.

In some embodiments, the operations further include responsive to determining to use the face editor, adjusting at least a portion of target facial features in the target image based on face pixels from source facial features in the source image. In some embodiments, adjusting at least a portion of target facial features in the target image based on face pixels from the source facial features in the source image includes: extracting the target head in an initial pose and the source head; aligning the target head to a canonical pose; encoding the aligned target head as a target vector and the source head as a source vector in latent space; copying one or more components from the source vector to the target vector; rendering a modified target vector that includes the one or more components from the encoded source head; realigning a rendered target head to the initial pose; and blending the realigned target head with the source image. In some embodiments, determining to use the face editor is based on an angular difference between a first angle of the target head and a second angle of the source head. In some embodiments, determining to use the head editor is based on a bounding box that surrounds the target head or a target face and a distance between the bounding box and bounding boxes associated with one or more other subjects in the target image. In some embodiments, generating the composite image further includes responsive to identifying remaining target pixels in the target image that are associated with the target head and not the source head, inpainting the remaining target pixels.

A non-transitory computer-readable medium with instructions stored thereon that, responsive to execution by one or more processing devices, causes the one or more processing devices to perform operations. The operations include receiving a set of images that include a source image and a target image, the source image and the target image including at least a subject; determining, based on the set of images, whether to use one or more editors selected from a group of a head editor, a face editor, or combinations thereof; and responsive to determining to use the head editor, generating a composite image by replacing at least a portion of head pixels associated with a target head of the subject in the target image with head pixels from a source head of the subject in the source image and replacing neck pixels associated with a target neck and shoulder pixels associated with target shoulders that include an area between the target head and a target torso with an interpolated region that is generated from an interpolation of the source image and the target image.

In some embodiments, the operations further include responsive to determining to use the face editor, adjusting at least a portion of target facial features in the target image based on face pixels from source facial features in the source image. In some embodiments, adjusting at least a portion of target facial features in the target image based on face pixels from the source facial features in the source image includes: extracting the target head in an initial pose and the source head; aligning the target head to a canonical pose; encoding the aligned target head as a target vector and the source head as a source vector in latent space; copying one or more components from the source vector to the target vector; rendering a modified target vector that includes the one or more components from the encoded source head; realigning a rendered target head to the initial pose; and blending the realigned target head with the source image. In some embodiments, determining to use the face editor is based on an angular difference between a first angle of the target head and a second angle of the source head. In some embodiments, determining to use the head editor is based on a bounding box that surrounds the target head or a target face and a distance between the bounding box and bounding boxes associated with one or more other subjects in the target image.

DETAILED DESCRIPTION

Overview

A media application generates a composite image where one or more of the subjects in the composite image have heads and/or faces that are from source images. Previous attempts to combine portions of images may result in unrealistic composite images where seams are visible, pixels from an original object are visible where a replacement object does not align with the original object, occluding objects result in artifacts, etc.

In some embodiments, the media application receives a source image and a target image and determines whether to use a head editor and/or a face editor to generate the composite image. For example, the media application may select the head editor based on two subjects in the target image having heads far enough apart or a head not being occluded by an object. In another example, the media application may select the face editor based on a difference of the pose of an angle of the face between the source image and the target image being close enough that portions of the source image can be added to the target image.

The head editor may replace a head in the target image with the head in the source image. The face editor may adjust portions of the face, such as eyes and mouths, from the target image based on portions of the face from the source image. For example, the face editor may use an embedding to compute pixel values for the portions of the face in the target image. The media application generates a composite image from the combinations of the target image and the source image.

Generating the composite image can include analyzing image data to determine occlusion and transforming image data and perform inpainting to avoid visible seams or other defects that could cause the composite image to appear unrealistic. In other words, the techniques described herein for generating a composite image from one or more source images can seamlessly preserve the realism of the one or more source images.

Example Environment

Figure 1:
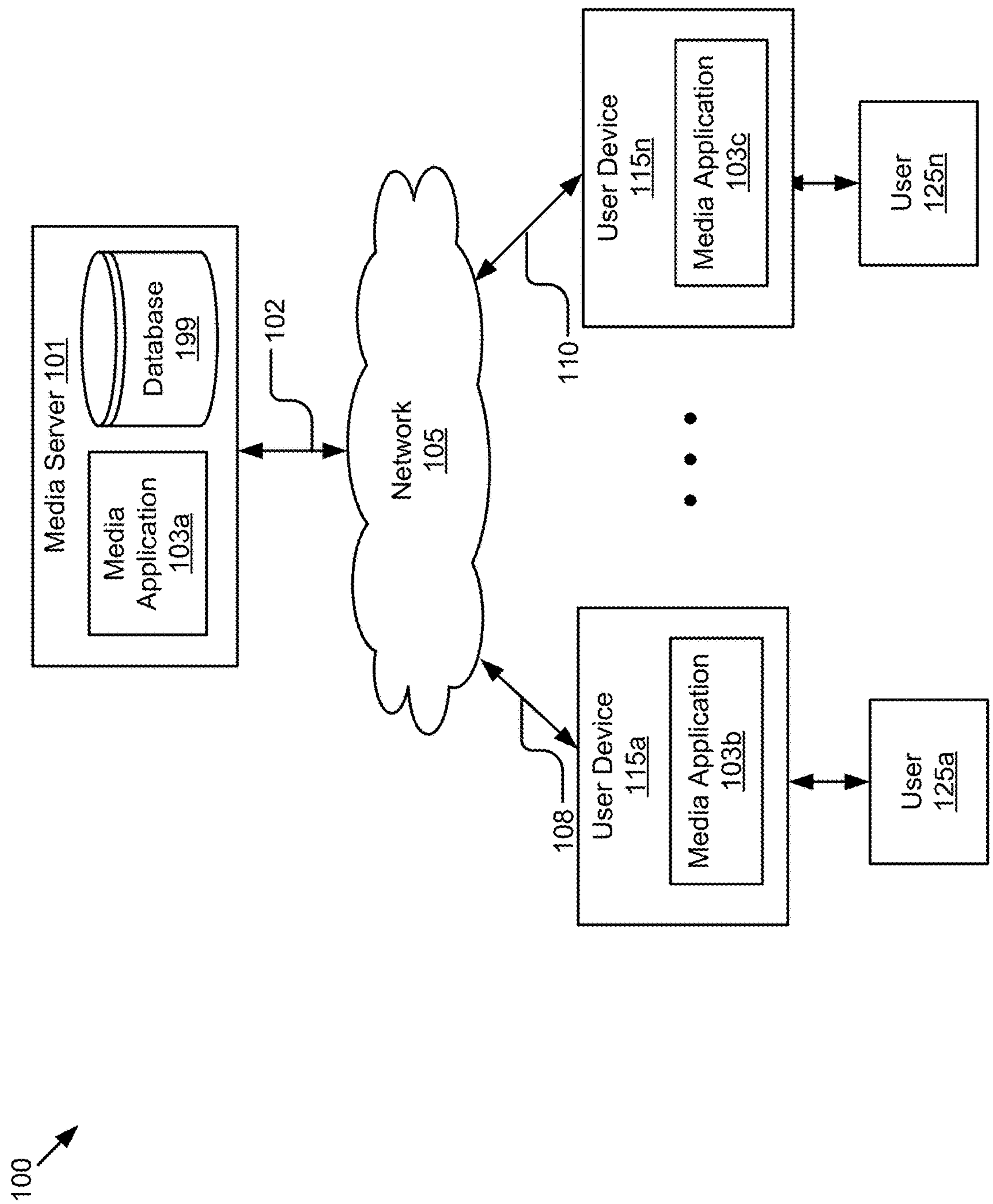
FIG. 1 is a block diagram of an example network environment, according to some embodiments described herein.

FIG. 1 illustrates a block diagram of an example environment 100. In some embodiments, the environment 100 includes a media server 101, a user device 115*a*, and a user device 115*n* coupled to a network 105. Users 125*a*, 125*n* may be associated with respective user devices 115*a*, 115*n*. In some embodiments, the environment 100 may include other servers or devices not shown in FIG. 1. In FIG. 1 and the remaining figures, a letter after a reference number, e.g., "115*a*," represents a reference to the element having that particular reference number. A reference number in the text without a following letter, e.g., "115," represents a general reference to embodiments of the element bearing that reference number.

The media server 101 may include a processor, a memory, and network communication hardware. In some embodiments, the media server 101 is a hardware server. The media server 101 is communicatively coupled to the network 105 via signal line 102. Signal line 102 may be a wired connection, such as Ethernet, coaxial cable, fiber-optic cable, etc., or a wireless connection, such as Wi-Fi®, Bluetooth®, or other wireless technology. In some embodiments, the media server 101 sends and receives data to and from one or more of the user devices 115*a*, 115*n* via the network 105. The media server 101 may include a media application 103*a* and a database 199.

The database 199 may store machine-learning models, training data sets, images, etc. The database 199 may also store social network data associated with users 125, user preferences for the users 125, etc.

The user device 115 may be a computing device that includes a memory coupled to a hardware processor. For example, the user device 115 may include a mobile device, a tablet computer, a mobile telephone, a wearable device, a head-mounted display, a mobile email device, a portable game player, a portable music player, a reader device, or another electronic device capable of accessing a network 105.

In the illustrated implementation, user device 115*a* is coupled to the network 105 via signal line 108 and user device 115*n* is coupled to the network 105 via signal line 110. The media application 103 may be stored as media application 103*b* on the user device 115*a* and/or media application 103*c* on the user device 115*n*. Signal lines 108 and 110 may be wired connections, such as Ethernet, coaxial cable, fiber-optic cable, etc., or wireless connections, such as Wi-Fi®, Bluetooth®, or other wireless technology. User devices 115*a*, 115*n* are accessed by users 125*a*, 125*n*, respectively. The user devices 115*a*, 115*n* in FIG. 1 are used by way of example. While FIG. 1 illustrates two user devices, 115*a* and 115*n*, the disclosure applies to a system architecture having one or more user devices 115.

The media application 103 may be stored on the media server 101 or the user device 115. In some embodiments, the operations described herein are performed on the media server 101 or the user device 115. In some embodiments, some operations may be performed on the media server 101 and some may be performed on the user device 115. Performance of operations is in accordance with user settings. For example, the user 125*a* may specify settings that operations are to be performed on their respective device 115*a* and not on the media server 101. With such settings, operations described herein are performed entirely on user device 115*a* and no operations are performed on the media server 101. Further, a user 125*a* may specify that images and/or other data of the user is to be stored only locally on a user device 115*a* and not on the media server 101. With such settings, no user data is transmitted to or stored on the media server 101. Transmission of user data to the media server 101, any temporary or permanent storage of such data by the media server 101, and performance of operations on such data by the media server 101 are performed only if the user has agreed to transmission, storage, and performance of operations by the media server 101. Users are provided with options to change the settings at any time, e.g., such that they can enable or disable the use of the media server 101.

Machine learning models (e.g., neural networks or other types of models), if utilized for one or more operations, are stored and utilized locally on a user device 115, with specific user permission. Server-side models are used only if permitted by the user. Further, a trained model may be provided for use on a user device 115. During such use, if permitted by the user 125, on-device training of the model may be performed. Updated model parameters may be transmitted to the media server 101 if permitted by the user 125, e.g., to enable federated learning. Model parameters do not include any user data.

The media application 103 receives a set of images that include a source image and a target image, the source image and the target image including at least a subject. The media application 103 determines, based on the set of images, whether to use a head editor and/or a face editor. Responsive to determining to use the head editor, the media application 103 generates a composite image by: replacing at least a portion of head pixels associated with a target head of the subject in the target image with head pixels from a source head of the subject in the source image and replacing neck pixels associated with a target neck and shoulder pixels associated with target shoulders that include an area between the target head and a target torso with an interpolated region that is generated from an interpolation of the source image and the target image.

In some embodiments, the media application 103 may be implemented using hardware including a central processing unit (CPU), a field-programmable gate array (FPGA), an application-specific integrated circuit (ASIC), machine learning processor/co-processor, any other type of processor, or a combination thereof. In some embodiments, the media application 103*a* may be implemented using a combination of hardware and software.

Example Computing Device

Figure 2:
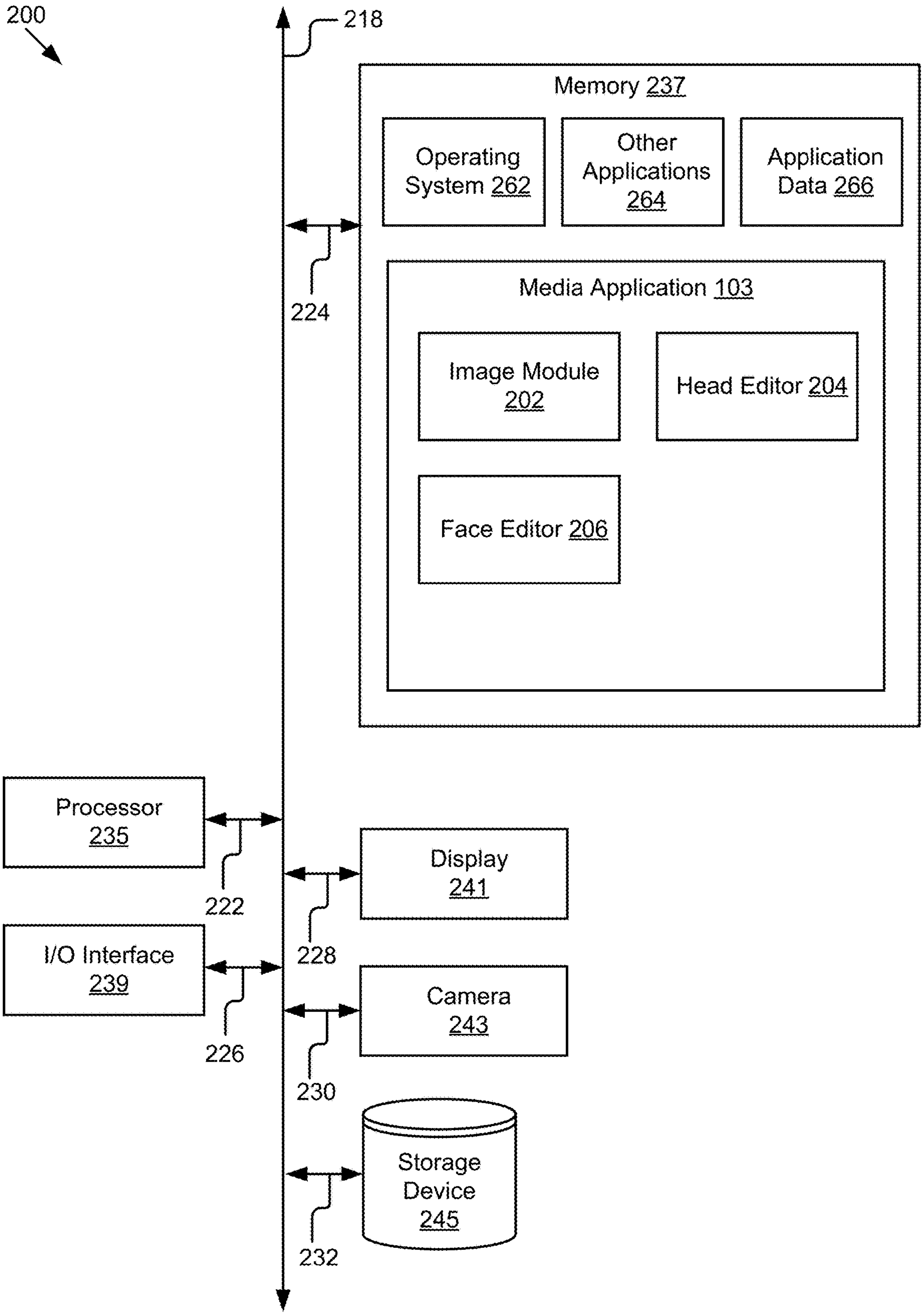
FIG. 2 is a block diagram of an example computing device, according to some embodiments described herein.

FIG. 2 is a block diagram of an example computing device 200 that may be used to implement one or more features described herein. Computing device 200 can be any suitable computer system, server, or other electronic or hardware device. In one example, computing device 200 is media server 101 used to implement the media application 103*a*. In another example, computing device 200 is a user device 115.

In some embodiments, computing device 200 includes a processor 235, a memory 237, an input/output (I/O) interface 239, a display 241, a camera 243, and a storage device 245 all coupled via a bus 218. The processor 235 may be coupled to the bus 218 via signal line 222, the memory 237 may be coupled to the bus 218 via signal line 224, the I/O interface 239 may be coupled to the bus 218 via signal line 226, the display 241 may be coupled to the bus 218 via signal line 228, the camera 243 may be coupled to the bus 218 via signal line 230, and the storage device 245 may be coupled to the bus 218 via signal line 232.

Processor 235 can be one or more processors and/or processing circuits to execute program code and control basic operations of the computing device 200. A "processor" includes any suitable hardware system, mechanism or component that processes data, signals or other information. A processor may include a system with a general-purpose central processing unit (CPU) with one or more cores (e.g., in a single-core, dual-core, or multi-core configuration), multiple processing units (e.g., in a multiprocessor configuration), a graphics processing unit (GPU), a field-programmable gate array (FPGA), an application-specific integrated circuit (ASIC), a complex programmable logic device (CPLD), dedicated circuitry for achieving functionality, a special-purpose processor to implement neural network model-based processing, neural circuits, processors optimized for matrix computations (e.g., matrix multiplication), or other systems. In some embodiments, processor 235 may include one or more co-processors that implement neural-network processing. In some embodiments, processor 235 may be a processor that processes data to produce probabilistic output, e.g., the output produced by processor 235 may be imprecise or may be accurate within a range from an expected output. Processing need not be limited to a particular geographic location or have temporal limitations. For example, a processor may perform its functions in real-time, offline, in a batch mode, etc. Portions of processing may be performed at different times and at different locations, by different (or the same) processing systems. A computer may be any processor in communication with a memory.

Memory 237 is typically provided in computing device 200 for access by the processor 235, and may be any suitable processor-readable storage medium, such as random access memory (RAM), read-only memory (ROM), Electrical Erasable Read-only Memory (EEPROM), Flash memory, etc., suitable for storing instructions for execution by the processor or sets of processors, and located separate from processor 235 and/or integrated therewith. Memory 237 can store software operating on the computing device 200 by the processor 235, including a media application 103.

The memory 237 may include an operating system 262, other applications 264, and application data 266. Other applications 264 can include, e.g., an image library application, an image management application, an image gallery application, communication applications, web hosting engines or applications, media sharing applications, etc. One or more methods disclosed herein can operate in several environments and platforms, e.g., as a stand-alone computer program that can run on any type of computing device, as a web application having web pages, as a mobile application ("app") run on a mobile computing device, etc.

The application data 266 may be data generated by the other applications 264 or hardware of the computing device 200. For example, the application data 266 may include images used by the image library application and user actions identified by the other applications 264 (e.g., a social networking application), etc.

I/O interface 239 can provide functions to enable interfacing the computing device 200 with other systems and devices. Interfaced devices can be included as part of the computing device 200 or can be separate and communicate with the computing device 200. For example, network communication devices, storage devices (e.g., memory 237 and/or storage device 245), and input/output devices can communicate via I/O interface 239. In some embodiments, the I/O interface 239 can connect to interface devices such as input devices (keyboard, pointing device, touchscreen, microphone, scanner, sensors, etc.) and/or output devices (display devices, speaker devices, printers, monitors, etc.).

Some examples of interfaced devices that can connect to I/O interface 239 can include a display 241 that can be used to display content, e.g., images, video, and/or a user interface of an output application as described herein, and to receive touch (or gesture) input from a user. For example, display 241 may be utilized to display a user interface that includes a graphical guide on a viewfinder. Display 241 can include any suitable display device such as a liquid crystal display (LCD), light emitting diode (LED), or plasma display screen, cathode ray tube (CRT), television, monitor, touchscreen, three-dimensional display screen, or other visual display device. For example, display 241 can be a flat display screen provided on a mobile device, multiple display screens embedded in a glasses form factor or headset device, or a monitor screen for a computer device.

Camera 243 may be any type of image capture device that can capture images and/or video. In some embodiments, the camera 243 captures images or video that the I/O interface 239 transmits to the media application 103.

The storage device 245 stores data related to the media application 103. For example, the storage device 245 may store a training data set that includes labeled images, a machine-learning model, output from the machine-learning model, etc.

FIG. 2 illustrates an example media application 103, stored in memory 237, that includes an image module 202, a head editor 204, and a face editor 206.

The image module 202 generates graphical data for displaying a user interface that includes a set of images. The set of images may be received from the camera 243 of the computing device 200 and/or from the media server 101 via the I/O interface 239. For example, the set of images may include images from a burst of images captured by the camera 243. The burst of images may include multiple photos that are captured rapidly in succession over a short time period. The set of images includes one or more source images and a target image that include one or more subjects. The one or more subjects may be human, animals, etc.

The image module 202 obtains permission from a user to modify any image in the set of images. A user may be provided with controls allowing the user to make an election as to both if and when systems, programs, or features described herein may enable collection or use of user information (e.g., identification of the user in an image, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

In some embodiments, the image module 202 selects the one or more source images and the target image to be used to generate a composite image. For example, the image module 202 may automatically generate a composition score for each image in a set of images based on composition factors, such as the types of objects in the image, the position of the subjects, the lighting, etc. For example, the target image may be selected based on having the best landscape composition as well as the subjects in the group being positioned well. In another example, the target image may be selected based on having a greatest number of subjects looking at the camera, smiling, with eyes that are open, etc. The image with an overall high composition score may be used for the target image. In some embodiments, the user may select a particular image in the set of images as a target image, and one or more other images in the set of images may be presented as source images.

The image module 202 may select the one or more source images based on the subjects in the image. For example, the image module 202 may generate face scores for each subject in an image based on quality metrics. For example, each face can be scored based on whether the face features a smile, open eyes, is fully or partially occluded in the photo by other people or objects, and/or is free from motion (e.g., is not blurry). The image module 202 may generate head scores based on a position of the subject's head, such as a higher head score for heads that are in a vertical plane (e.g., directly facing the camera) instead of other angles (e.g., tilted, rotated away from the camera, etc.). Such scoring can be performed using image detection and recognition techniques, such as trained machine-learning models that can detect a face within a photo and apply quality scoring criteria.

Based on the scores, the image module 202 may rank the faces in the images. For example, the image module 202 may determine that multiple particular faces in different images of the set of images belong to the same subject (person, animal, etc.), and each such subject can be associated with a ranked list of faces from the images. The image module 202 may automatically select the target image and the one or more source images or the image module 202 may suggest the top-ranked images as suggestions to a user for the user to confirm selection of a particular image as the target image.

In some embodiments, the image module 202 generates graphical data for displaying a user interface that provides options for the user to select the target image and the one or more source images from a set of images. The set of images that are included in the user interface may be from a burst of captured images, images captured during a particular time period (e.g., the last 24 hours, images captured at a particular location, etc.).

Figure 3B:
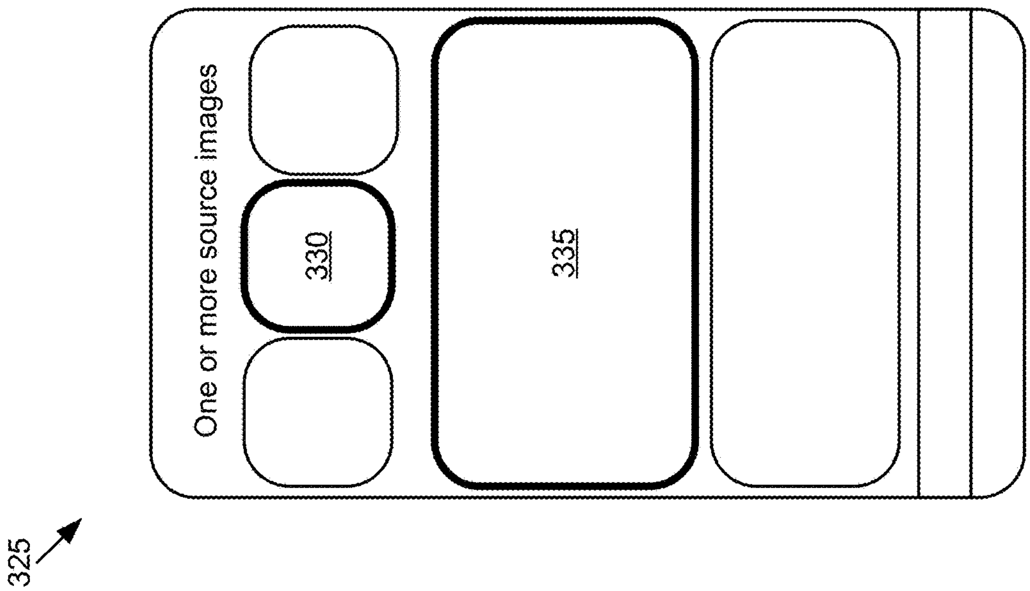
FIG. 3B is an example user interface that includes options for a user to specify one or more source images from a set of images, according to some embodiments described herein.
Figure 3A:
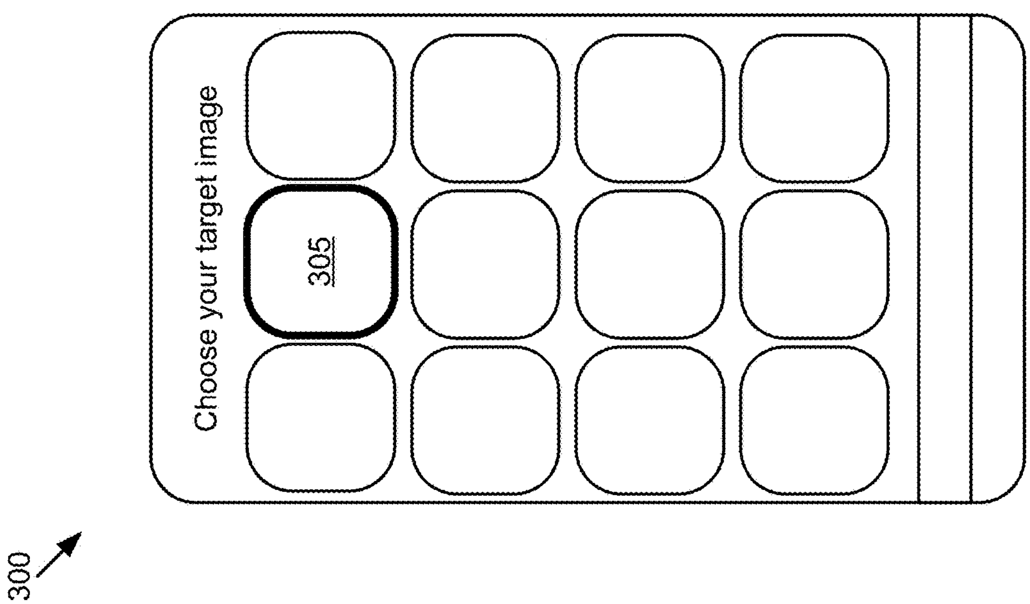
FIG. 3A is an example user interface that includes options for a user to specify a target image from a set of images, according to some embodiments described herein.

FIG. 3A is an example user interface 300 that includes options for a user to specify a target image from a set of images. In this example, the user selects an image 305 to be used as a target image. In some embodiments, a particular image from the set of images may be suggested as a target image, e.g., highlighted (e.g., with a border, icon, etc.). The user can select the suggested image or any other image as the target image.

FIG. 3B is an example user interface 325 that includes options for a user to specify one or more source images from a set of images. In this example, the user selects a first image 330 to be used as a source image for a first subject and a second image 335 to be used as a source image for a second subject. In some embodiments, the image module 202 may generate a user interface that includes options for selecting a particular subject in an image. For example, the computing device 200 may receive user input in the form of a double click of a subject, a circle around the subject's head, etc.

In some embodiments, a single image may be selected as a source image for two or more subjects. In some embodiments, each subject may be associated with a different source image. In some embodiments, a suggestion of a source image may be provided for one or more subjects. For example, if the target image has a first subject with a tilted head, and a second subject with closed eyes, a first source image where the first subject has a head facing the camera without a tilt, and a second source image where the second subject has open eyes, may be suggested as respective source images. In some embodiments, other factors such as lighting, duration of time between capture of the target image and particular source images, distance between the position of a subject in the source image and the target image, etc. may be used in selecting particular source images to be recommended.

In some embodiments, the user interface may include an option to search for another source image. For example, the user interface may include an option for the user to scroll through (or otherwise browse) images in a camera roll and select a source image. In some embodiments, because the source image from the camera roll may have been captured with different lighting conditions, with different shadows, etc., the image module 202 may modify the source image to have a color (and/or other image attributes such as brightness, white balance, contrast, etc.) that is consistent with the corresponding attributes of the target image.

The image module 202 determines whether to use a head editor 204, a face editor 206, or both to generate the composite image. The image module 202 may use different criteria to make the determination, such as a proximity of heads within a target image or a source image, an angle of heads within a target image or a source image, and an occlusion of a head in a target image or a source image.

In some embodiments, the image module 202 determines whether to use a head editor 204 or a face editor 206 based on different factors that are evaluated by different classifiers. In some embodiments, the image module 202 performs a weighted sum or a logistic regression of the different factors such that the determination is made based on the totality of the factors and not one single factor. In some embodiments, some of the factors may be dispositive, such as if one of the heads is 70% occluded by an object.

In some embodiments, the classifiers are trained from ratings of head edits from the head editor 204 and face edits from the face editor 206 in a training set of images. For example, the training data may include a target image, a source image, a composite image that was generated by the head editor 204 and/or the face editor 206, and a corresponding rating for the composite image where the corresponding rating may be provided by a person or a quality algorithm. As a result of receiving the ratings, the image module 202 may recalculate classifier weights to improve the quality of the composite images generated by the head editor 204 and the face editor 206.

In some embodiments, the image module 202 generates bounding boxes around each target head/target face in a target image and determines whether to use the head editor 204 to replace a target head with the source head based on a distance between the bounding boxes in the target image. For example, if there is overlap between the bounding boxes, which indicates that the heads of the subjects are close together, the head editor 204 may not be used due to variation in the head positions when multiple subjects being close together results in a larger section of the background that is inpainted in the composite image and the potential for overlap in the subjects complicates aligning the subjects in the target image and the one or more source images. In some embodiments, the image module 202 determines whether to use the head editor 204 based on a continuous function. In some embodiments, the continuous function is based on a weighted distance between the bounding boxes and/or a weighted percentage of overlap between the bounding boxes where the value of the weights may be learned during training of a classifier used by the image module 202.

In some embodiments, the image module 202 determines whether to use a head editor 204 based on an angular difference between a first angle of the target head and a second angle of the source head. The face editor 206 may generate unsatisfactory or low-quality composite images if the angle of the head of the source image is greater than a threshold difference from the angle of the head of the target image.

The image module 202 may determine to use the face editor 206 based on applying a nonlinear function to the difference between the first angle and the second angle. In some embodiments, the image module 202 applies cosine to the first angle, applies cosine to the second angle, and determines the difference between the first angle and the second angle. In some embodiments, the image module 202 uses a threshold angle difference to determine whether to use the face editor 206 such that if the difference between angles exceeds the threshold angle difference, the image module 202 determines to use the head editor 204 and not the face editor 206.

In some embodiments, the image module 202 determines whether to use a head editor 204 based on occlusion of the target head or occlusion of the source head. When the image module 202 receives either a target image or a source image that is occluded, the resulting composite image has a higher rate of failure and/or is of low quality when the source image is occluded. In some embodiments, the image module 202 may use a color histogram of the images to determine whether the source head or the target head is occluded. For example, the image module 202 may use the mean of a particular channel in the histogram to identify an occlusion.

In some embodiments, the image module 202 determines whether to use the head editor 204, the face editor 206, or both the head editor 204 and the face editor 206 based on a distance from the subject to the image boundaries. For example, if a head is close to the image boundary and the head editor 204 changes a pose of the head close to the image boundary, it may result in part of the head being cropped off the image boundary (thus providing an unsatisfactory composited image, since the subject head is not fully within the image).

The head editor 204 replaces a target head with a source head. In some embodiments, the head editor 204 replaces target pixels associated with a target head in the target image with source pixels from a source head in a source image. The head editor 204 may generate a head mask that includes the subject's hair, segment the head mask from the source image, and apply the pixels within the head mask to the target image. The head editor 204 may modify the position and the scale of the source head to be consistent with the dimensions of the target head.

The head editor 204 performs inpainting in instances where replacing the target head with the source head results in portions where the target head and the source head do not overlap. This may occur if the target head and the source head are associated with different angles. This may also occur when the angle of the target head and the source head in the target and source images are different and the head editor 204 aligns an angle of the target head with an angle of the source head, prior to replacing. Aligning the target head with the source head may identify portions of the target head where the source head does not overlap. The head editor 204 may identify remaining pixels in the target image that are associated with the target head and not the source head and perform inpainting of the remaining target pixels by replacing the remaining target pixels. Inpainting pixels may include determining a distance between source pixels and remaining pixels and generating replacement pixels that are based on a similarity and distance to the source pixels.

Because the target head and the source head are at different angles, the subject's neck area may be positioned differently in the two images. The head editor 204 renders a smooth transition between the target torso and the source head by generating an interpolated region of a neck and shoulder region. In some embodiments, the head editor 204 generates an interpolated region that includes an area between the target head and a target torso (e.g., an area described as a target neck and target shoulders) and replaces the target pixels associated with the target neck and the target shoulders with the interpolated region where the interpolated region is an interpolation of target pixels and source pixels for the corresponding neck and shoulder regions. In some embodiments, the head editor 204 uses multiple image frames, such as a set of image frames generated from a burst of images captured by the camera 243 and generates the interpolated region from multiple image frames.

Figure 4B:
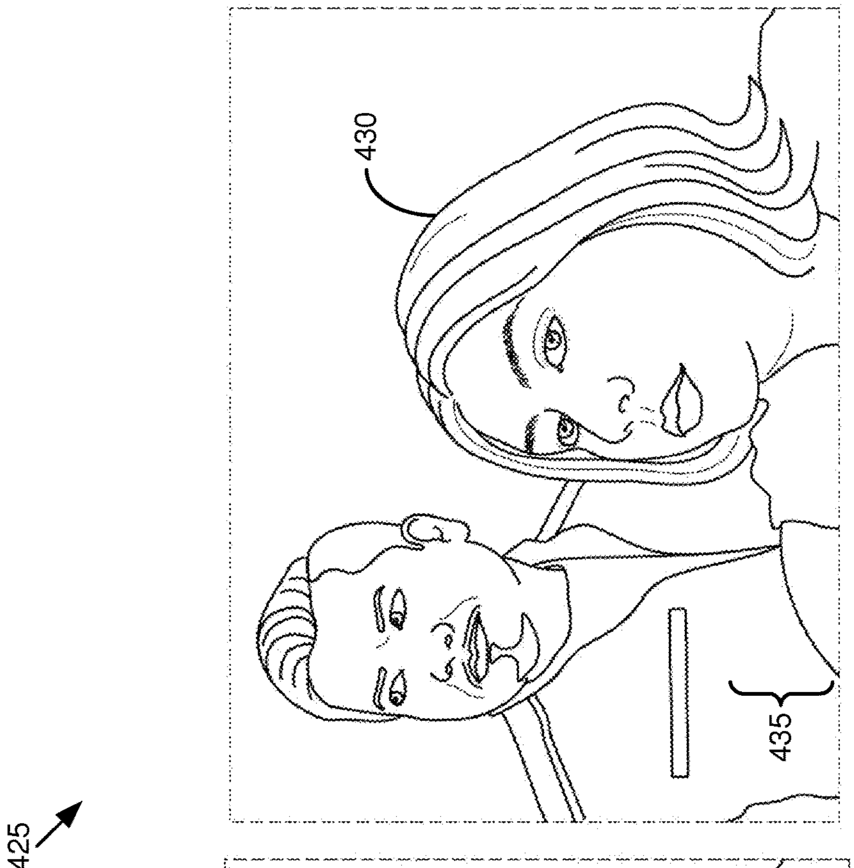
FIG. 4B is an example composite image generated by a head editor, according to some embodiments described herein.
Figure 4A:
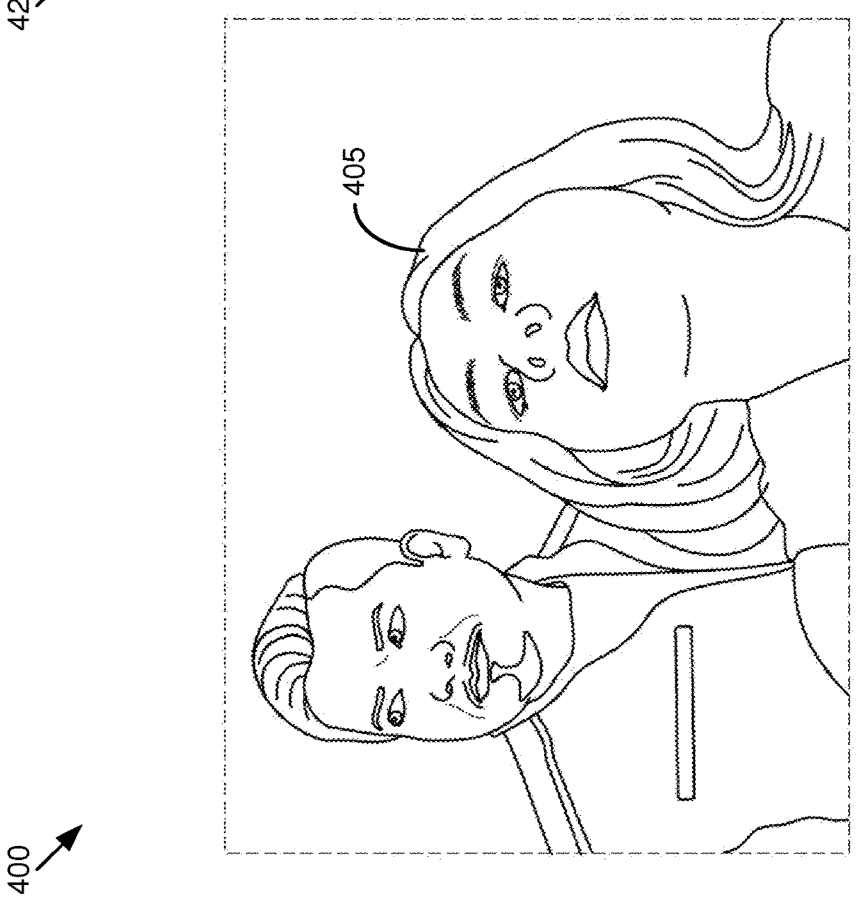
FIG. 4A is an example target image for a head editor, according to some embodiments described herein.

Turning to FIG. 4A, an example target image 400 for a head editor, according to some embodiments described herein. The subject 405 on the right is looking upwards and has smooth shoulders.

FIG. 4B is an example composite image 425 generated by a head editor 204. The head editor 204 replaced the target head with a source head for the subject 430 on the right. In the composite image 425, an interpolated region 435 for the neck and the tops of the shoulders are a result of the neck being in a different direction and the shoulders including more crinkled fabric as compared to the shoulders on the subject 405 in the target image 400.

In some embodiments, the head editor 204 includes a machine-learning model that receives the target image and one or more source images as input and outputs a composite image. The trained machine-learning model may include one or more model forms or structures. For example, model forms or structures can include any type of neural-network, such as a linear network, a deep-learning neural network that implements a plurality of layers (e.g., "hidden layers" between an input layer and an output layer, with each layer being a linear network), a convolutional neural network (e.g., a network that splits or partitions input data into multiple parts or tiles, processes each tile separately using one or more neural-network layers, and aggregates the results from the processing of each tile), a sequence-to-sequence neural network (e.g., a network that receives as input sequential data, such as words in a sentence, frames in a video, etc. and produces as output a result sequence), etc.

The model form or structure may specify connectivity between various nodes and organization of nodes into layers. For example, nodes of a first layer (e.g., an input layer) may receive data as input data or application data. Such data can include, for example, one or more pixels per node, e.g., when the trained model is used for analysis, e.g., of a target image and one or more source images. Subsequent intermediate layers may receive as input, output of nodes of a previous layer per the connectivity specified in the model form or structure. These layers may also be referred to as hidden layers. A final layer (e.g., output layer) produces an output of the machine-learning model. For example, the output layer may output the composite image. In some embodiments, model form or structure also specifies a number and/or type of nodes in each layer.

In different embodiments, the trained model can include one or more models. One or more of the models may include a plurality of nodes, arranged into layers per the model structure or form. In some embodiments, the nodes may be computational nodes with no memory, e.g., configured to process one unit of input to produce one unit of output. Computation performed by a node may include, for example, multiplying each of a plurality of node inputs by a weight, obtaining a weighted sum, and adjusting the weighted sum with a bias or intercept value to produce the node output. In some embodiments, the computation performed by a node may also include applying a step/activation function to the adjusted weighted sum. In some embodiments, the step/activation function may be a nonlinear function. In various embodiments, such computation may include operations such as matrix multiplication. In some embodiments, computations by the plurality of nodes may be performed in parallel, e.g., using multiple processors cores of a multicore processor, using individual processing units of a graphics processing unit (GPU), or special-purpose neural circuitry. In some embodiments, nodes may include memory, e.g., may be able to store and use one or more earlier inputs in processing a subsequent input. For example, nodes with memory may include long short-term memory (LSTM) nodes. LSTM nodes may use the memory to maintain “state” that permits the node to act like a finite state machine (FSM).

In some embodiments, the trained model may include embeddings or weights for individual nodes. For example, a model may be initiated as a plurality of nodes organized into layers as specified by the model form or structure. At initialization, a respective weight may be applied to a connection between each pair of nodes that are connected per the model form, e.g., nodes in successive layers of the neural network. For example, the respective weights may be randomly assigned, or initialized to default values. The model may then be trained, e.g., using training data, to produce a result.

Training may include applying supervised learning techniques. In supervised learning, the training data can include a plurality of inputs (e.g., target images and source images, segmentation masks, etc.) and a corresponding groundtruth output for each input (e.g., a groundtruth mask that correctly identifies a portion of the subject, such as the subject’s face, in each image, a composite image, etc.). Based on a comparison of the output of the model with the groundtruth output, values of the weights are automatically adjusted, e.g., in a manner that increases a probability that the model produces the groundtruth output for the composite image.

In various embodiments, a trained model includes a set of weights, or embeddings, corresponding to the model structure. In some embodiments, the trained model may include a set of weights that are fixed, e.g., downloaded from a server that provides the weights. In various embodiments, a trained model includes a set of weights, or embeddings, corresponding to the model structure. In embodiments where data is omitted, head editor 204 may generate a trained model that is based on prior training, e.g., by a developer of head editor 204, by a third-party, etc. In some embodiments, the trained model may include a set of weights that are fixed, e.g., downloaded from a server that provides the weights.

In some embodiments, the trained machine-learning model receives a target image and one or more source images with one or more subjects. The machine-learning model may generate one or more segmentation masks that identify the pixels in the one or more source images that correspond to the one or more heads including the hair in the one or more source images. For each subject, the machine-learning model replaces the head pixels from the target image with the head pixels from the one or more source images with a corresponding position, scale, and angle that conform to the source image. The machine-learning model blends the head pixels along the edge of the head. In some embodiments, background pixels that were revealed as a result of differences between the source head and the target head are inpainted. In some embodiments, the machine-learning model blends an interpolated region into the target image that correspond to the neck and the shoulders of the subject. In some embodiments, the trained machine-learning model outputs a composite image that incorporates these changes.

In some embodiments, the machine-learning model outputs a confidence value for each composite image output by the trained machine-learning model. The confidence value may be expressed as a percentage, a number from 0 to 1, etc. For example, the machine-learning model outputs a confidence value of 85% for a confidence that the composite image correctly replaced the target head with the source head and does not include pixels from another person or an object. In some embodiments, the composite image is provided to a user if the confidence value exceeds a threshold confidence value. In some embodiments, the confidence value is precomputed and the composite image is not generated unless the confidence value exceeds a threshold confidence value.

In some embodiments, the head editor 204 includes multiple machine-learning models that perform different functions in the steps used to generate the composite image. For example, a first machine-learning model may replace target pixels associated with a target head with source pixels from a source head, a second machine-learning model aligns the source head with the target head, and a third machine-learning model generates an interpolation region that replaces target pixels associated with a target neck and target shoulders.

Figure 5:
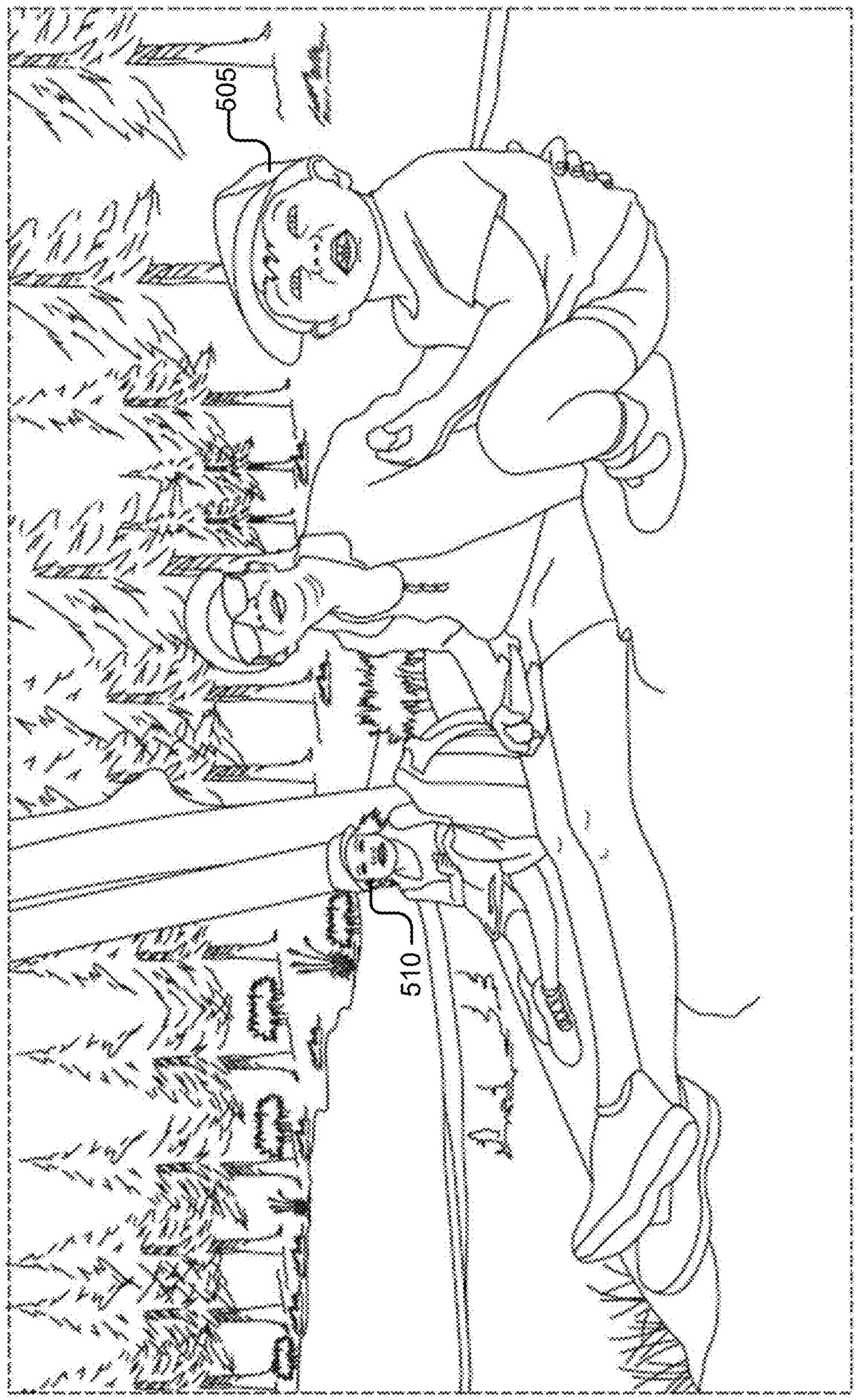
FIG. 5 is an example target image, according to some embodiments described herein.

FIG. 5 is an example target image 500. The boy’s head 505 and the girl’s head 510 in the target image 500 are to be replaced by heads from a source image.

Figure 6A:
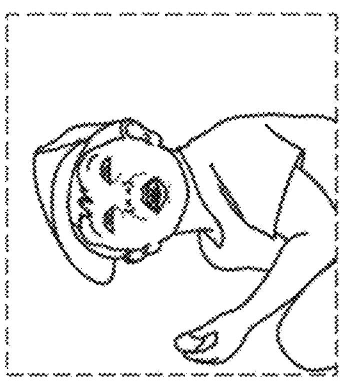
FIG. 6A is an example first target head isolated from a target image, according to some embodiments described herein.
Figure 6B:
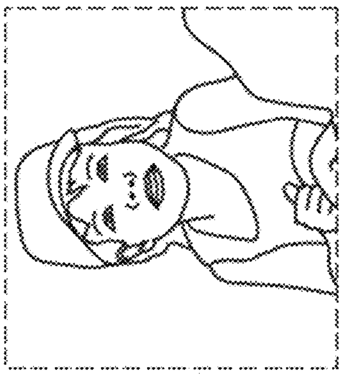
FIG. 6B is an example second target head isolated from the target image, according to some embodiments described herein.

FIG. 6A is an example first target head 600 isolated from the target image 500 of FIG. 5. FIG. 6B is an example second target head 650 isolated from the target image 500 of FIG. 5. The first target head 600 may be isolated and selected for replacement because the boy’s nose is upturned and his mouth is open. The second target head 650 may be isolated and selected for replacement because the girl is not looking directly at the camera.

Figure 7A:
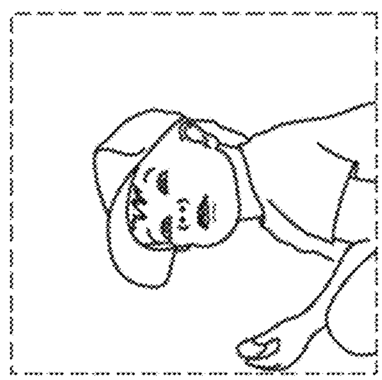
FIG. 7A is an example first source head isolated from a source image, according to some embodiments described herein.
Figure 7B:
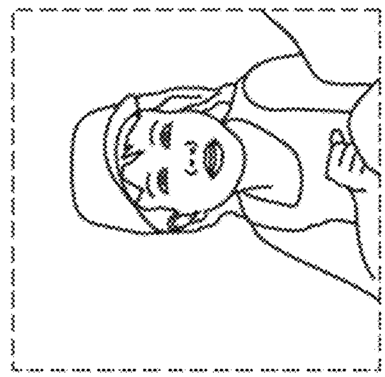
FIG. 7B is an example second source head isolated from a source image, according to some embodiments described herein.

FIG. 7A is an example first source head 700 isolated from a source image. FIG. 7B is an example second source head 750 isolated from the same source image that includes the first source head 700 or from a different source image. The head editor 204 replaces at least a portion of target pixels associated with the first target head 600 and at least a portion of target pixels associated with the second target head 650 with source pixels from the first source head 700 and the second source head 750, respectively.

Figure 8A:
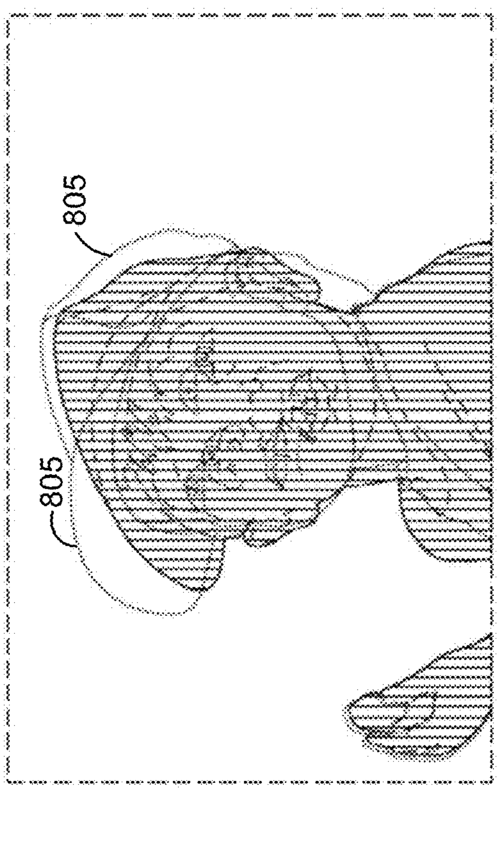
FIG. 8A is an example first source head that is aligned with the first target head, according to some embodiments described herein.
Figure 8B:
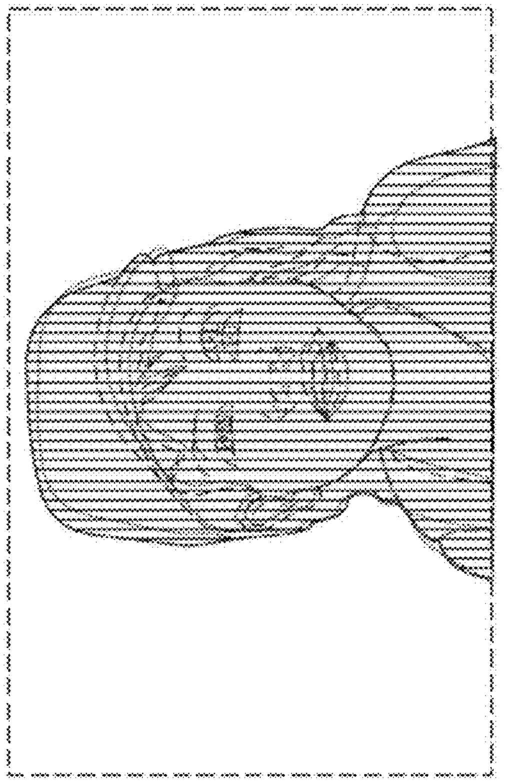
FIG. 8B is an example second source head that is aligned with the second target head, according to some embodiments described herein.

FIG. 8A is an example 800 first source head that is aligned with the first target head. FIG. 8B is an example 850 second source head that is aligned with the second target head. Although the images are aligned, there are some places where the images do not overlap, such as the position of the boy's cap 805.

Figure 9:
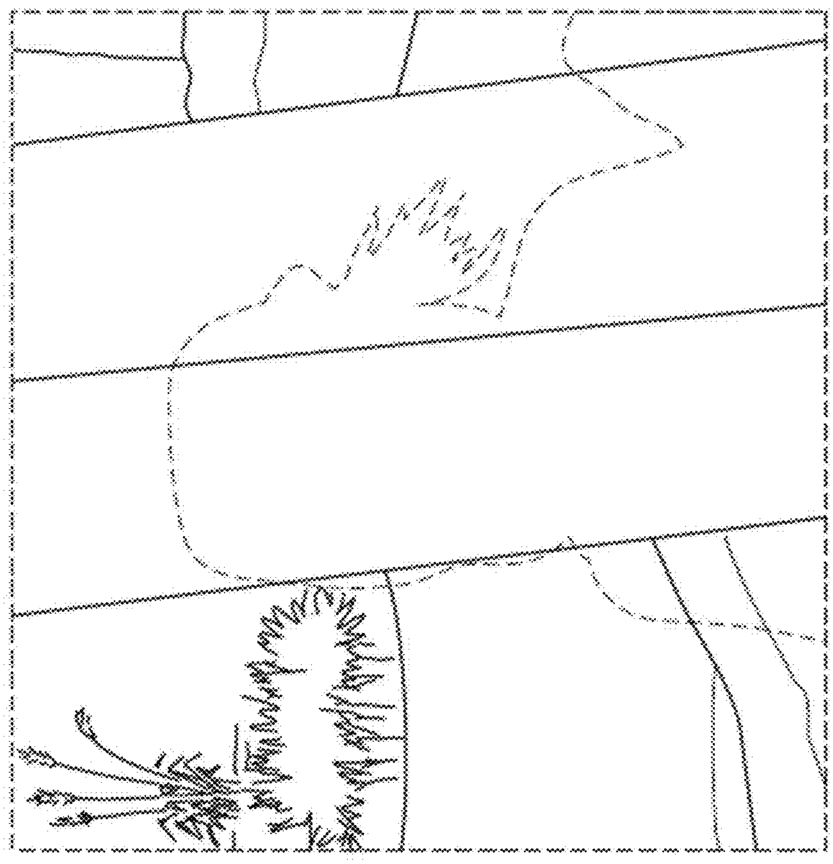
FIG. 9 is an example composite image that is analyzed for inpainting, according to some embodiments described herein.

FIG. 9 is an example composite image 900 that is analyzed for inpainting based on the alignment of the first source head exposing areas of the background that were previously covered by the first target head. After the head editor 204 performs inpainting of the target heads, the composite image has an appearance such that the source heads fit in the composite image without visible seams or other defects.

Figure 10:
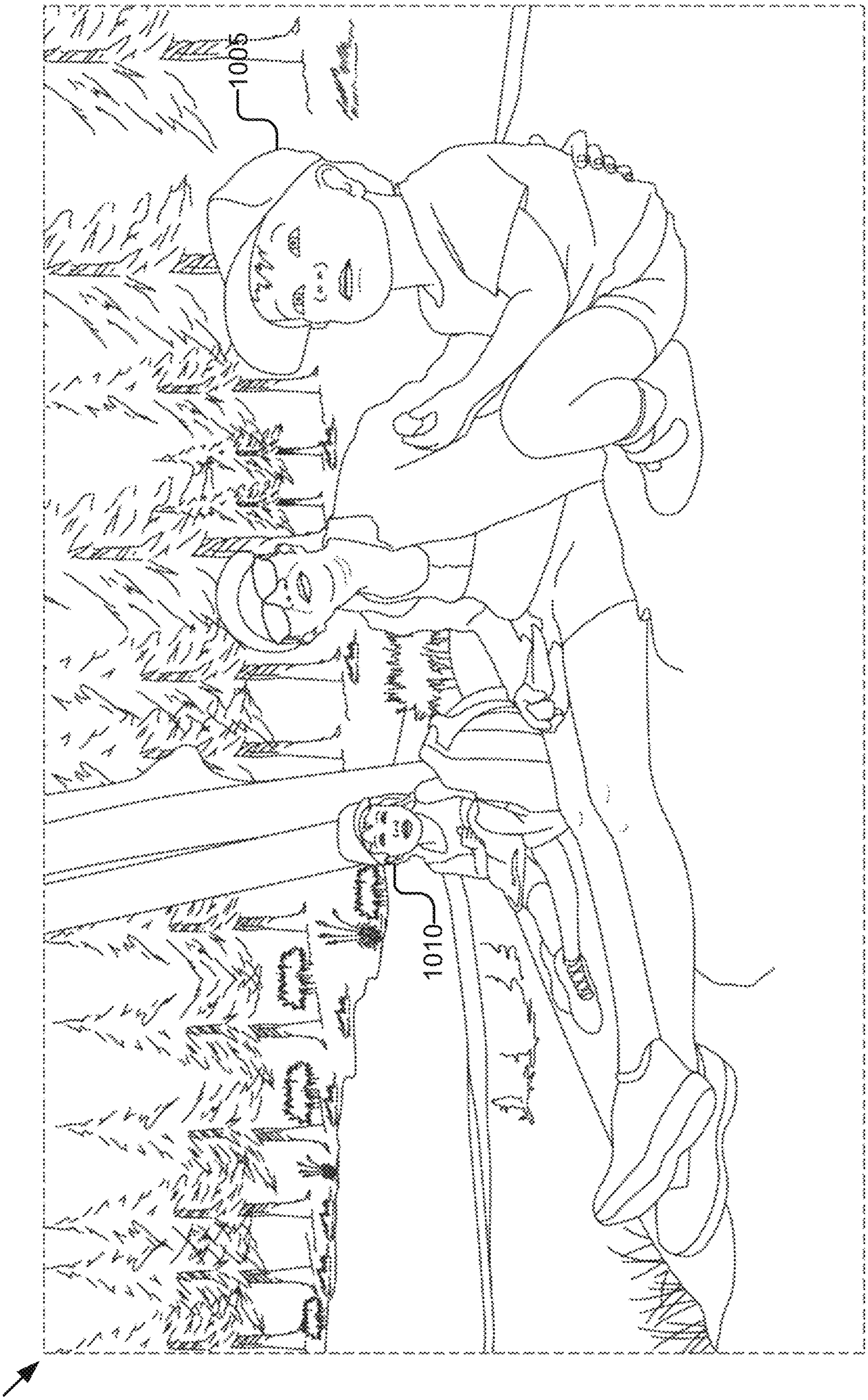
FIG. 10 is an example composite image where the source heads replace the target heads of FIG. 5, according to some embodiments described herein.

FIG. 10 is an example composite image 1000 where the source heads replaced the target heads. The boy's head 505 in FIG. 5 is replaced with the boy's head 1005 in FIG. 10 and the girl's head 510 in FIG. 5 is replaced with the girl's head 1010 in FIG. 10.

The face editor 206 transfers facial features (e.g., smiles, open eyes, mouth shapes, etc.) from the source image to the target image. The face editor 206 does not change the pose of the target face. In some embodiments, the face editor 206 adjusts at least a portion of target pixel values associated with target facial features in the target image based on source pixels from the source facial features in the source image.

In some embodiments, the face editor 206 extracts the target face and the source face of the same subject using a face-matching algorithm, implemented with specific user permission. The face editor 206 aligns the target face from an initial pose to a canonical pose, where the canonical pose is one of the poses that the machine-learning model is trained to use.

In some embodiments, the face editor 206 uses a machine-learning model selected from one of the model types described above with reference to the head editor 204. For example, the machine-learning model may include an encoder and a convolutional neural network (CNN).

In some embodiments, not all of a target face is replaced with a source because some components of the face may be more susceptible to small changes in angle and pose. For example, a person's nose may look out-of-place if a nose from a head that is tipped upward is added to a face that is looking straight ahead. As a result, the encoder of the machine-learning model uses a facial features mask (e.g., an eye/mouth mask) to encode components of the source head as a source vector. The encoder also encodes the target head as a target vector. The machine-learning model copies the corresponding components from the source vector to the target vector.

In some embodiments, the CNN includes multiple layers that each generate a version of a composite image by rendering the target vector that includes the source vector components. The CNN generates the composite image with increasingly higher levels of resolution in each layer. High resolution outputs are mixed with existing lower-resolution layers until a final composite image is output. In some embodiments, the machine-learning model realigns the rendered target head back to the initial pose and blends the realigned target head with the source image, which is outputted as the composite image.

Figure 11:
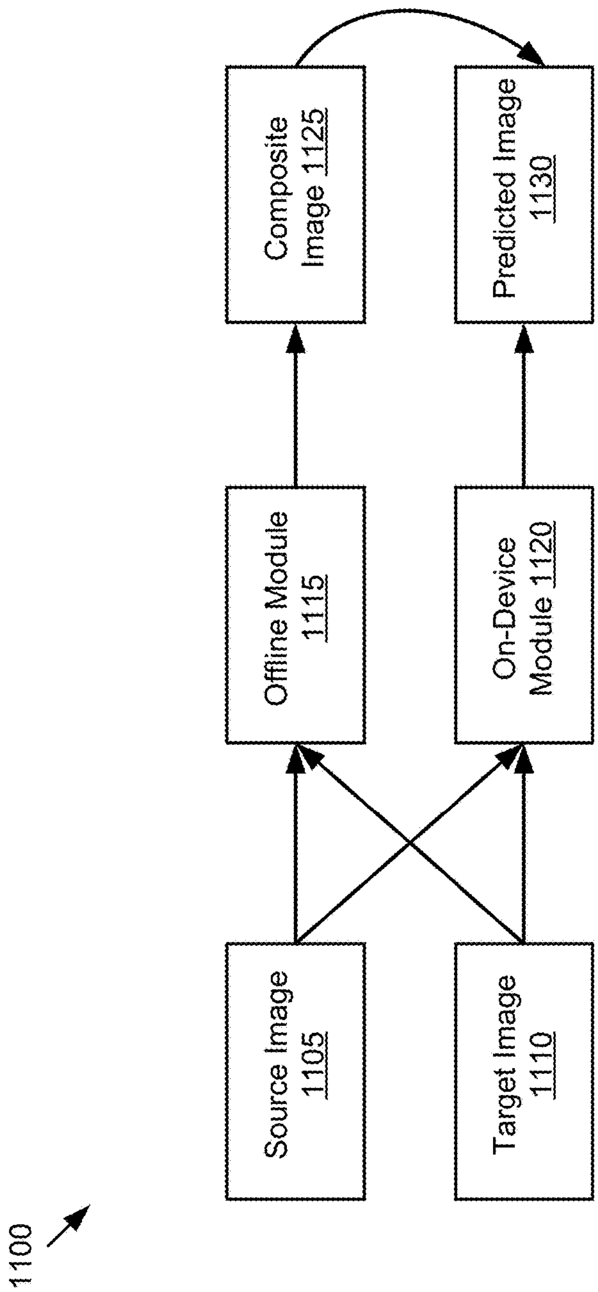
FIG. 11 is an example block diagram of a machine-learning model that generates a composite image, according to some embodiments described herein.

FIG. 11 is an example block diagram 1100 of an on-device machine-learning model that generates a composite image. A source image 1105 and a target image 1110 are received by both an offline module 1115 and an on-device module 1120, such as the media application 103 stored on the user device 115 illustrated in FIG. 1. The on-device module 1120 outputs a predicted image 1130, such that a facial expression and/or head pose from the source image 1105 is fused into the target image 1110. The on-device module 1120 is implemented such that it can run on user devices within the budgets of latency and memory usage, e.g., smartphones with or without machine-learning circuitry.

The offline module 1115 can provide supervision for the on-device model training, which advantageously enables a lightweight on-device module 1120 to generate a composite image 1125. The composite image 1125 may be a higher-quality version than the predicted image 1130 because the offline module 1115 has a larger budget for latency and memory usage.

In some embodiments, the on-device module 1120 may use warp and restoration where a dense face mesh warps the source image 1105 to the target position, and use a neural network (or other suitable technique) to remove the artifacts. Given two face images and their face meshes, the on-device module 1120 aligns the pose of the source face to the target face mesh, and then warps the source face to the target image. The warped face has the source expression, but with artifacts caused by alignment and warping, which may be considered as degradation. The on-device module 1120 may include a restoration model with supervision from the offline module 1115 that can remove or remediate the degradation.

In some embodiments, an on-device module 1120 may modify faces to reflect a designated expression. The on-device module 1120 may include two encoders: a source encoder to extract an expression code from the source image and a target encoder to extract head pose and appearance information from the target image. The on-device module 1120 may insert the expression code at one or more levels (e.g., at every level) of the decoder. Skim connections from the target encoder may also be added to ensure that the on-device module 1120 edits the face and not other parts of the image.

Figure 12B:
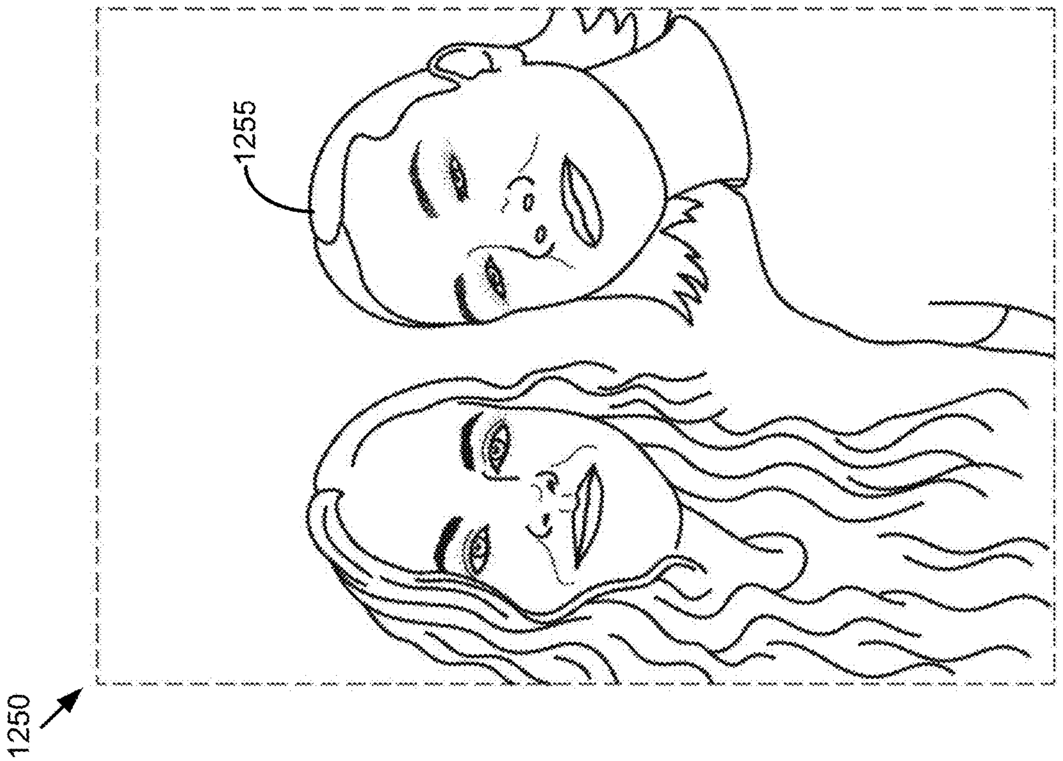
FIG. 12B is an example composite image generated by the face editor, according to some embodiments described herein.
Figure 12A:
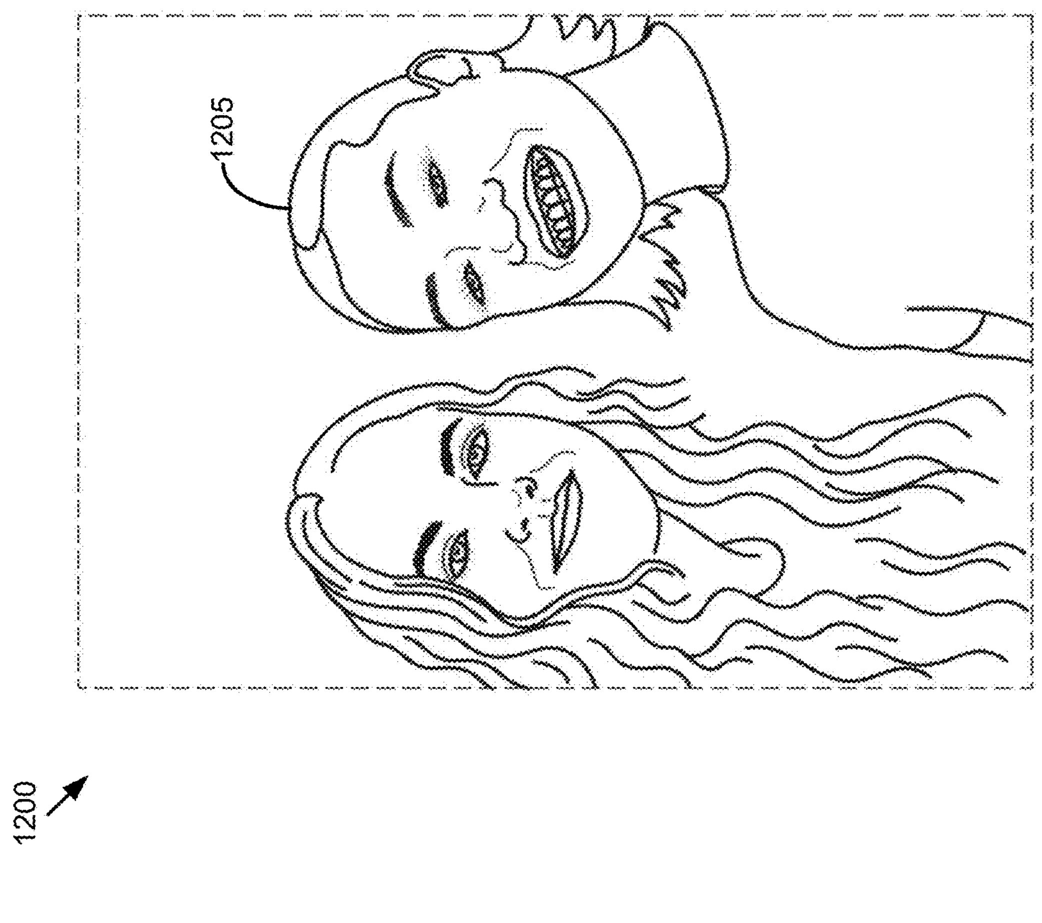
FIG. 12A is an example target image for a face editor, according to some embodiments described herein.

FIG. 12A is an example target image 1200 where the second subject 1205 has an expression that is replaced by the face editor 206.

FIG. 12B is an example composite image 1250 generated by the face editor 206 according to the techniques described above. As can be seen, the open-mouthed, toothy smile of the subject 1205 on the right in the target image 1200 is replaced by a close-mouthed grin of the subject 1255 in the composite image 1250.

Figure 13:
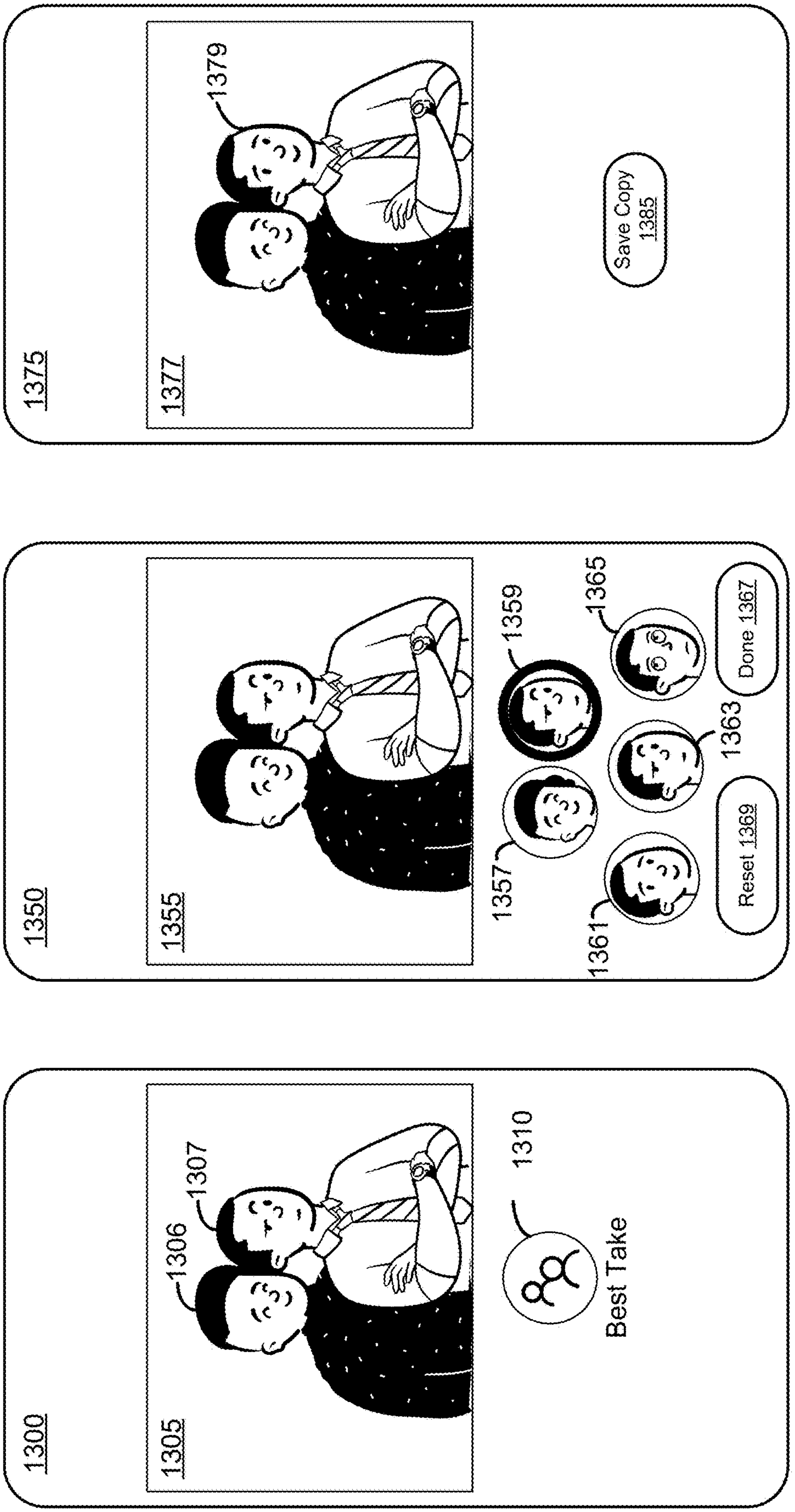
FIG. 13 illustrates example user interfaces to select a best take, according to some embodiments described herein.

FIG. 13 illustrates example user interfaces 1300, 1350, 1375 to select a best take, according to some embodiments described herein. A first user interface 1300 includes a target image 1305 of two subjects 1306, 1307. A user may select the "Best Take" button 1310 to start a process for obtaining a composite image.

A second user interface 1350 includes the target image 1355 and icons 1357, 1359 of the first subject and the second subject, respectively. A user may select one of the icons 1357, 1359 to select a different face for the subject. In this example, the user has selected the icon 1359 of the second subject. The user interface 1350 includes three options 1361, 1363, and 1365 for the second subject. The first option 1361 and the third option 1365 are from source images, while the second option 1363 is from the target image 1355. Once the user selects one of the three options 1361, 1363, and 1365, the user may select the done button 1367 to see a composite image a selected option on the target image 1355 or select the reset button 1369 to restart the process. In this example, the user selects the first option 1361 and selects the done button 1367.

A third user interface 1375 includes the composite image 1377, which is generated from the target image 1355 of the second user interface 1350 and the source face 1379. The user may press the save copy button 1385 to save a copy of the image.

Example Flowchart

Figure 14:
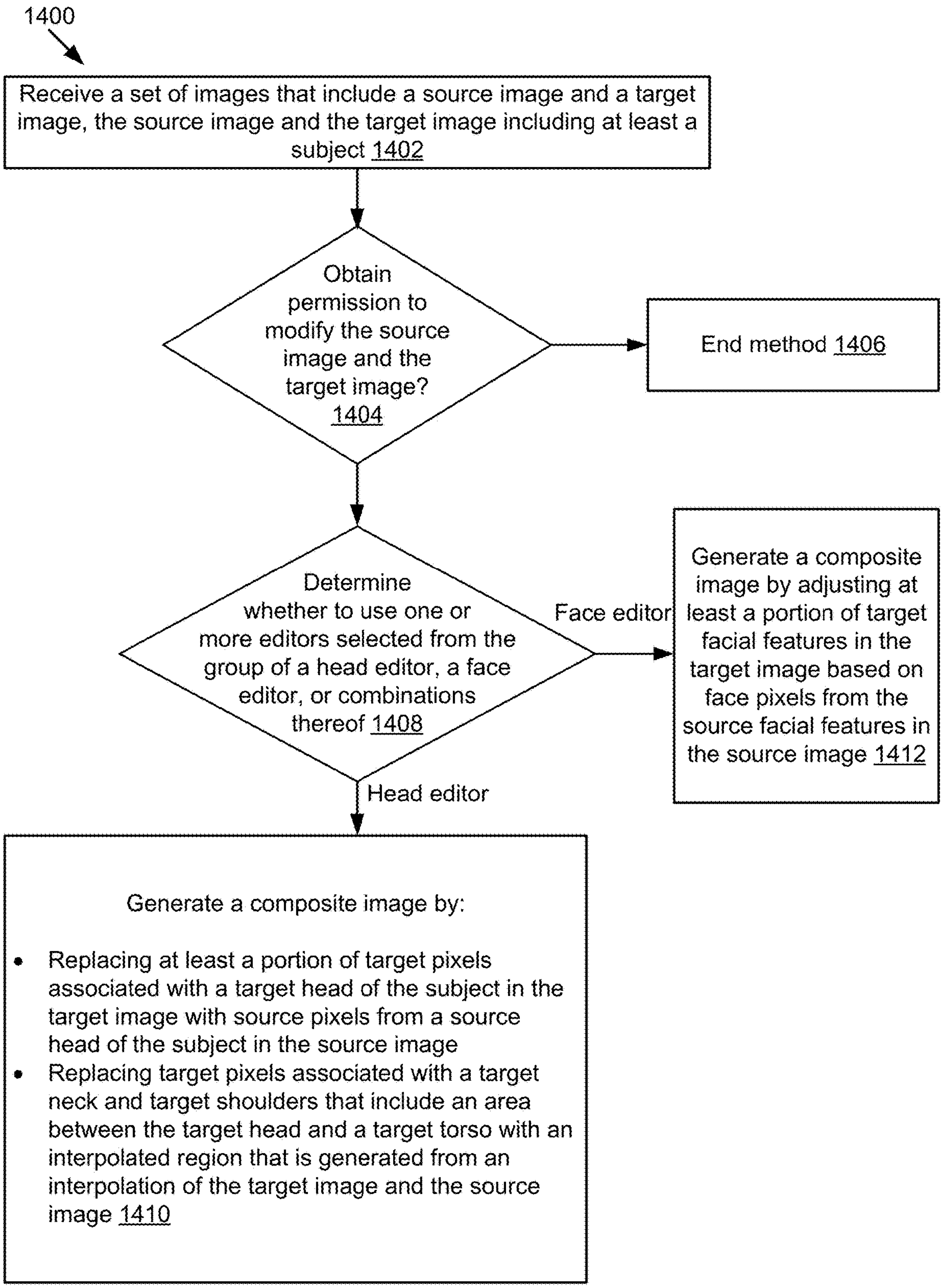
FIG. 14 illustrates a flowchart of an example method to generate a composite image, according to some embodiments described herein.

FIG. 14 illustrates a flowchart of an example method 1400 to segment an image, according to some embodiments described herein. The method 1400 may be performed by the computing device 200 in FIG. 2. In some embodiments, the method 1400 is performed by the user device 115, the media server 101, or in part on the user device 115 and in part on the media server 101.

The method 1400 of FIG. 14 may begin at block 1402. At block 1402, a set of images are received that include a source image and a target image, the source image and the target image including one or more subjects. In some embodiments, before block 1402, the method 1400 further includes capturing the set of images with a camera, providing a user interface to a user that includes the target image and an option to select the source head from a set of source images, the set of source images including the source image, and receiving a selection of the source image from the user. The subjects may include humans or animals. Block 1402 may be followed by block 1404.

At block 1404, it is determined whether permission is obtained to modify the source image and the target image. If permission is not obtained, block 1404 may be followed by block 1406 where the method 1400 ends. If permission is obtained, block 1404 may be followed by block 1408.

At block 1408, it is determined whether to use one or more editors selected from the group of a head editor, a face editor, or combinations thereof. Determining to use the face editor may be based on an angular difference between a first angle of the target head and a second angle of the source head; a bounding box that surrounds the target head or a target face and a distance between the bounding box and bounding boxes associated with other subjects in the target image; or occlusion of the target head or occlusion of the source head. Determining the occlusion of the target head or the occlusion of the source head may be based on determining a difference in color histograms.

If the head editor is selected, block 1408 may be followed by block 1410. At block 1410, a composite image is generated by: replacing at least a portion of head pixels associated with a target head of the subject in the target image with head pixels from a source head of the subject in the source image and replacing neck pixels associated with a target neck and shoulder pixels associated with target shoulders that include an area between the target head and a target torso with an interpolated region that is generated from an interpolation of the source image and the target image. In some embodiments, the head editor aligns an angle of the target head with an angle of the source head prior to replacing at least the portion of the target pixels associated with the target head in the target image. If the face editor is selected, block 1408 may be followed by block 1412.

At block 1412, a composite image is generated by adjusting at least a portion of target facial features in the target image based on face pixels from the source facial features in the source image. In some embodiments, adjusting at least a portion of target facial features in the target image based on face pixels from the source facial features in the source image includes: extracting the target head in an initial pose and the source head, aligning the target head to a canonical pose, encoding the aligned target head as a target vector and the source head as a source vector in latent space, copying one or more components from the source vector to the target vector, rendering a modified target vector that includes the one or more components from the encoded source head, realigning a rendered target head to the initial pose, and blending the realigned target head with the source image.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the embodiments can be described above primarily with reference to user interfaces and particular hardware. However, the embodiments can apply to any type of computing device that can receive data and commands, and any peripheral devices providing services.

Reference in the specification to "some embodiments" or "some instances" means that a particular feature, structure, or characteristic described in connection with the embodiments or instances can be included in at least one implementation of the description. The appearances of the phrase "in some embodiments" in various places in the specification are not necessarily all referring to the same embodiments.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic data capable of being stored, transferred, combined, compared, and otherwise manipulated. It has proven convenient at times, principally for reasons of common usage, to refer to these data as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The embodiments of the specification can also relate to a processor for performing one or more steps of the methods described above. The processor may be a special-purpose processor selectively activated or reconfigured by a computer program stored in the computer. Such a computer program may be stored in a non-transitory computer-readable storage medium, including, but not limited to, any type of disk including optical disks, ROMs, CD-ROMs, magnetic disks, RAMS, EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

What is claimed is:

1. A computer-implemented method comprising:
- receiving a set of images that include a source image and a target image, the source image and the target image including at least a subject;
- determining, based on the set of images, whether to use one or more editors selected from a group of a head editor, a face editor, or combinations thereof; and
- responsive to determining to use the head editor, generating a composite image by:
  - replacing at least a portion of head pixels associated with a target head of the subject in the target image with head pixels from a source head of the subject in the source image; and
  - replacing neck pixels associated with a target neck and shoulder pixels associated with target shoulders that include an area between the target head and a target torso with an interpolated region that is generated from an interpolation of the source image and the target image.

2. The method of claim 1, further comprising:
- responsive to determining to use the face editor, adjusting at least a portion of target facial features in the target image based on face pixels from source facial features in the source image.

3. The method of claim 2, wherein adjusting at least a portion of target facial features in the target image based on face pixels from the source facial features in the source image includes:
- extracting the target head in an initial pose and the source head;
- aligning the target head to a canonical pose;
- encoding the aligned target head as a target vector and the source head as a source vector in latent space;
- copying one or more components from the source vector to the target vector;
- rendering a modified target vector that includes the one or more components from the source vector;
- realigning a rendered target head to the initial pose; and
- blending the realigned target head with the target image.

4. The method of claim 2, wherein determining to use the face editor is based on an angular difference between a first angle of the target head and a second angle of the source head.

5. The method of claim 1, wherein determining to use the head editor is based on a bounding box that surrounds the target head or a target face and a distance between the bounding box and bounding boxes associated with one or more other subjects in the target image.

6. The method of claim 1, wherein generating the composite image further includes responsive to identifying remaining target pixels in the target image that are associated with the target head and not the source head, inpainting the remaining target pixels.

7. The method of claim 1, further comprising:
- determining an occlusion of the target head or an occlusion of the source head based on determining a difference in color histograms of the target image and the source image;
- wherein determining to use the head editor is based on the occlusion of the target head or occlusion of the source head.

8. The method of claim 1, before determining, based on the set of images, whether to use the one or more editors, the method further comprising:
- capturing, with a camera, the set of images;
- providing a user interface to a user that includes the target image and an option to select the source head from a set of source images, the set of source images including the source image; and
- receiving, from the user, a selection of the source image.

9. The method of claim 1, wherein the subject in the source image is a human or an animal.

10. A system comprising:
- one or more processors; and
- one or more computer-readable media, having instructions stored thereon that, when executed by the one or more processors, cause the one or more processors to perform operations comprising:
  - receiving a set of images that include a source image and a target image, the source image and the target image including at least a subject;
  - determining, based on the set of images, whether to use one or more editors selected from a group of a head editor, a face editor, or combinations thereof; and
  - responsive to determining to use the head editor, generating a composite image by:
    - replacing at least a portion of head pixels associated with a target head of the subject in the target image with head pixels from a source head of the subject in the source image; and replacing neck pixels associated with a target neck and shoulder pixels associated with target shoulders that include an area between the target head and a target torso with an interpolated region that is generated from an interpolation of the source image and the target image.

11. The system of claim 10, wherein the operations further include:

responsive to determining to use the face editor, adjusting at least a portion of target facial features in the target image based on face pixels from source facial features in the source image.

12. The system of claim 11, wherein adjusting at least a portion of target facial features in the target image based on face pixels from the source facial features in the source image includes:

extracting the target head in an initial pose and the source head;

aligning the target head to a canonical pose;

encoding the aligned target head as a target vector and the source head as a source vector in latent space;

copying one or more components from the source vector to the target vector;

rendering a modified target vector that includes the one or more components from the source vector;

realigning a rendered target head to the initial pose; and blending the realigned target head with the target image.

13. The system of claim 11, wherein determining to use the face editor is based on an angular difference between a first angle of the target head and a second angle of the source head.

14. The system of claim 10, wherein determining to use the head editor is based on a bounding box that surrounds the target head or a target face and a distance between the bounding box and bounding boxes associated with one or more other subjects in the target image.

15. The system of claim 10, wherein generating the composite image further includes responsive to identifying remaining target pixels in the target image that are associated with the target head and not the source head, inpainting the remaining target pixels.

16. A non-transitory computer-readable medium with instructions stored thereon that, responsive to execution by one or more processing devices, cause the one or more processing devices to perform operations comprising:

receiving a set of images that include a source image and a target image, the source image and the target image including at least a subject;

determining, based on the set of images, whether to use one or more editors selected from a group of a head editor, a face editor, or combinations thereof; and responsive to determining to use the head editor, generating a composite image by:

replacing at least a portion of head pixels associated with a target head of the subject in the target image with head pixels from a source head of the subject in the source image; and replacing neck pixels associated with a target neck and shoulder pixels associated with target shoulders that include an area between the target head and a target torso with an interpolated region that is generated from an interpolation of the source image and the target image.

17. The non-transitory computer-readable medium of claim 16, wherein the operations further include:

responsive to determining to use the face editor, adjusting at least a portion of target facial features in the target image based on face pixels from source facial features in the source image.

18. The non-transitory computer-readable medium of claim 17, wherein adjusting at least a portion of target facial features in the target image based on face pixels from the source facial features in the source image includes:

extracting the target head in an initial pose and the source head;

aligning the target head to a canonical pose;

encoding the aligned target head as a target vector and the source head as a source vector in latent space;

copying one or more components from the source vector to the target vector;

rendering a modified target vector that includes the one or more components from the source vector;

realigning a rendered target head to the initial pose; and blending the realigned target head with the target image.

19. The non-transitory computer-readable medium of claim 17, wherein determining to use the face editor is based on an angular difference between a first angle of the target head and a second angle of the source head.

20. The non-transitory computer-readable medium of claim 16, wherein determining to use the head editor is based on a bounding box that surrounds the target head or a target face and a distance between the bounding box and bounding boxes associated with one or more other subjects in the target image.

* * * * *